US006622395B1

(12) United States Patent
Hickey

(10) Patent No.: US 6,622,395 B1
(45) Date of Patent: Sep. 23, 2003

(54) MEASURING DEVICE FOR PIPEFITTERS

(76) Inventor: Thomas B. Hickey, 1101 Orchard Dr., DeMotte, IN (US) 46310

(*) Notice: Subject to any disclaimer, the term of this patent is extended or adjusted under 35 U.S.C. 154(b) by 0 days.

(21) Appl. No.: 10/200,350

(22) Filed: Jul. 23, 2002

(51) Int. Cl.[7] .................... B43L 13/00; G01B 1/00

(52) U.S. Cl. .................... 33/529; 33/452; 33/474; 33/481

(58) Field of Search .................... 33/529, 370, 371, 33/412, 427, 429, 452, 464, 474, 481

(56) References Cited

U.S. PATENT DOCUMENTS

| | | | | | |
|---|---|---|---|---|---|
| 854,659 | A | | 5/1907 | Matthews | |
| 2,624,950 | A | * | 1/1953 | Mitchell | 33/529 |
| 2,854,744 | A | | 10/1958 | Crockett | |
| 4,092,782 | A | * | 6/1978 | Raybon | 33/529 |
| 4,344,215 | A | * | 8/1982 | Dearman | 29/281.5 |
| 4,375,724 | A | * | 3/1983 | Brock | 33/529 |
| 4,380,872 | A | * | 4/1983 | Moran | 33/529 |
| 4,388,765 | A | * | 6/1983 | Dearman | 33/464 |
| 4,497,119 | A | * | 2/1985 | Dearman | 33/464 |
| 4,506,451 | A | | 3/1985 | Hiltz | |
| 4,574,492 | A | | 3/1986 | Miller | |
| 4,614,043 | A | * | 9/1986 | Nagano et al. | 33/529 |
| 4,773,680 | A | | 9/1988 | Krumme | |
| 4,910,876 | A | | 3/1990 | Channell | |
| 4,961,360 | A | | 10/1990 | Peel et al. | |
| 5,039,139 | A | | 8/1991 | McElroy et al. | |
| 5,669,149 | A | | 9/1997 | Meitzler | |
| 6,505,412 | B2 | * | 1/2003 | Hauzie, Jr. | 33/529 |

* cited by examiner

*Primary Examiner*—Diego Gutierrez
*Assistant Examiner*—Yaritza Guadalupe
(74) *Attorney, Agent, or Firm*—Donald R. Schoonover

(57) ABSTRACT

A measuring device is used to orient and place portions of obstacles, such as pipes, conduits or the like and includes a framing square having an alignment bracket mounted thereon. The alignment bracket abuts one of the obstacles and one leg of the framing square is located adjacent to the other obstacle. The framing square then defines the location and path for a coupling element, such as an elbow or the like, used to couple the obstacles together.

6 Claims, 2 Drawing Sheets

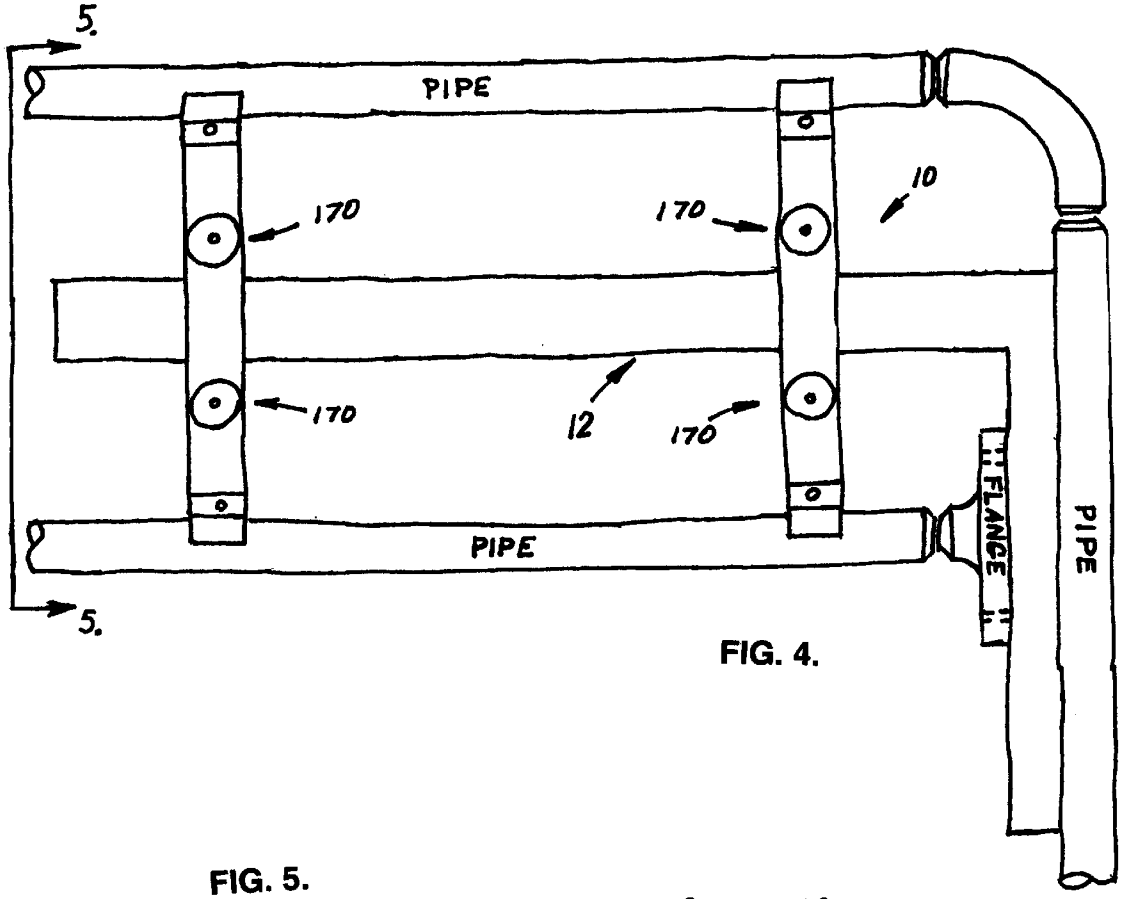
FIG. 4.
FIG. 5.
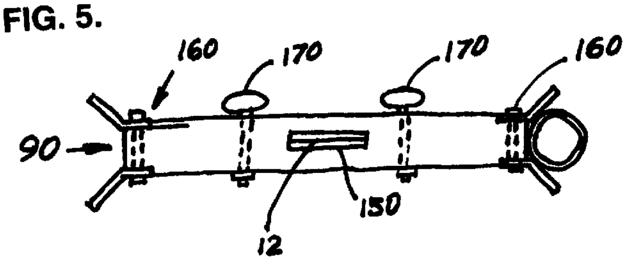

MEASURING DEVICE FOR PIPEFITTERS

BACKGROUND OF THE INVENTION

1. Field of the Invention

The present invention relates to the general art of measuring instruments, and to the particular field of levels and squares.

2. Discussion of the Related Art

The building and construction industry has undergone a significant growth in recent years. Many of the new structures being erected include conduits, pipes and the like. The conduits and pipes can carry fluids, liquids or even house electrical wiring or the like. These conduits often make a plurality of turns in the building to accommodate the needs of the building. As is well known in the building industry, these turns generally include some sort of elbow or 90° turn in the conduit.

As is also well known in the building industry, many building structures are located around such conduits. Such structures may create problems in properly locating all portions of a conduit. In the past, this has required a tradesman to carefully measure the conduit and the turns therein and then translate those measurements into marks and guides for completion of the conduit. This will be referred to in this disclosure as "squaring around" the elbow or other turn in a conduit or pipe or other such structure. It is noted that while this disclosure refers to conduits, pipes and the like, based on the teaching of the present disclosure. Those skilled in the art will understand other applications for the device disclosed herein, and such other applications are intended to be covered as well in the scope of the present disclosure. To emphasize the variety of objects that can be included, this disclosure will sometimes refer to "obstacles" so as not to be restricted to pipes, conduits and the like.

Therefore, there is a need for a measuring instrument that can accurately and efficiently square around an obstacle, including an obstacle having a 90° turn therein.

In the past, many of the measurements associated with erecting conduits and pipes and the like that have one or more angled turns therein have been made using rulers, calculations and marking instruments. While effective, this process has several drawbacks. For example, the process requires a tradesman to measure distances in sometimes difficult lighting and difficult locations, and then translate those distances into data that can be used for the particular job being performed. This may be difficult and onerous, especially if the job is being carried out in difficult conditions. Still further, this requires a tradesman to make calculations, which may introduce errors in the overall job. Still further, the prior method of measuring and marking such jobs is not as efficient as it could be if such measuring and marking were performed in a manner that is more efficient and accurate than is presently available.

Therefore, there is a need for a measuring instrument that can accurately and efficiently square around an obstacle without requiring the use of a ruler.

Still further, many conduits or other such obstacles require a conduit to be located such that building elements are located on the inside of the radius of curvature while other obstacles require building elements to be located on the outside of the radius of curvature. This variation may introduce problems of measurement, calculation and marking that may reduce accuracy as well as efficiency of a building job.

Therefore, there is a need for a measuring instrument that can be used to accurately and efficiently measure and mark a job on either the inside of a radius of curvature of an obstacle or on the outside of the radius of curvature of an obstacle.

PRINCIPAL OBJECTS OF THE INVENTION

It is a main object of the present invention to provide a measuring instrument that can accurately and efficiently square around an pipe or conduit or the like.

It is another object of the present invention to provide a measuring instrument that can accurately and efficiently square around an obstacle having a 90° turn therein.

It is another object of the present invention to provide a measuring instrument that can accurately and efficiently square around a pipe elbow location.

It is another object of the present invention to provide a measuring instrument that can accurately and efficiently square around a conduit elbow location.

It is another object of the present invention to provide a measuring instrument that can accurately and efficiently square around a structural steel elbow location.

It is another object of the present invention to provide a measuring instrument that can accurately and efficiently square around an obstacle without requiring the use of a ruler.

It is another object of the present invention to provide a measuring instrument that can be used to accurately and efficiently measure and mark a building job on either the inside of a radius of curvature of an obstacle or on the outside of the radius of curvature of an obstacle.

It is another object of the present invention to provide a measuring instrument that permits a pipefitter to accurately fit a flange or a 90° elbow to a pipe without the use of a ruler to measure to the side of the pipe to square it.

SUMMARY OF THE INVENTION

These, and other, objects are achieved by a measuring device for installing pipes and conduits having an elbow portion thereof and which comprises two obstacles, such as pipes or conduits or the like oriented at an angle with respect to each other, an L-shaped framing square having two legs and an alignment bracket movably mounted on one leg of the framing square and including an obstacle-engaging channel on one end of the alignment bracket which engages a portion of one obstacle of the two obstacles with a second leg of the framing square located near a second obstacle of the two obstacles. In one form of the invention, the obstacles are oriented at an angle of 90° with respect to each other.

The measuring instrument embodying the present invention permits a tradesman to accurately and efficiently square around to fit a flange or a 90° turn to a conduit without the use of a ruler. The conduit need not be measured in multiple locations and thus efficiency and accuracy are both increased over the prior art methods. Further, it does not matter whether the measurements are made on the inside of a radius of curvature or on the outside of a radius of curvature. Using the measuring instrument of the present invention completely eliminates the need for a ruler and the need to measure a pipe at two places on the side to square it. The framing square of the device of the present invention fits around the radius of an elbow and the device is used to square around a flange to its face.

BRIEF DESCRIPTION OF THE DRAWING FIGURES

FIG. 4 shows the measuring instrument embodying the present invention in association with two obstacles, one obstacle having the measuring instrument located on the inside of a radius of curvature and one obstacle having the measuring instrument located on the outside of a radius of curvature.

FIG. 5 is a modified view taken along line 5—5 of FIG. 4 in which only one of the obstacles is shown for the purposes of ease of presentation.

DETAILED DESCRIPTION OF THE INVENTION

Figure 1:
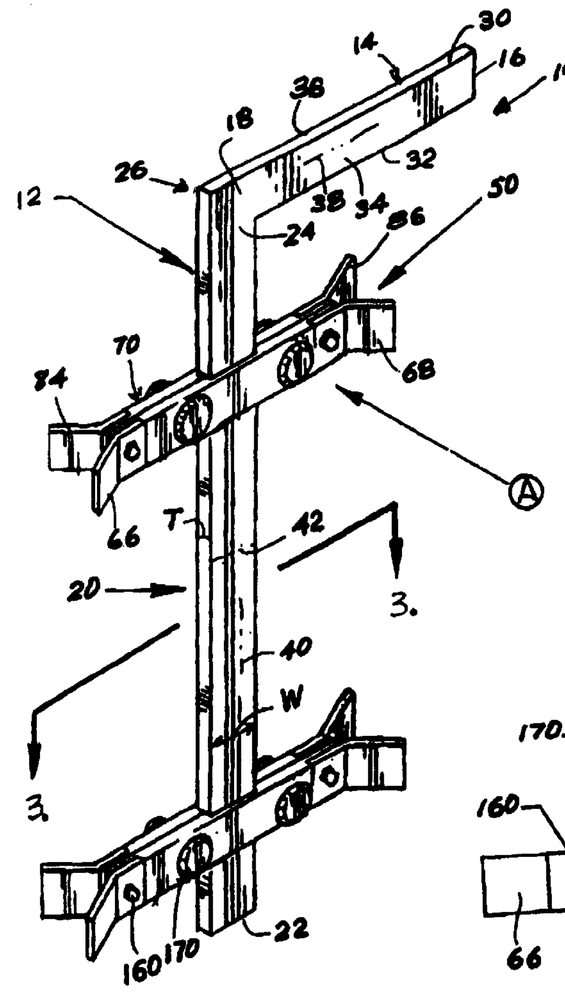
FIG. 1 is a perspective view of a measuring instrument embodying the present invention.
Figure 2:
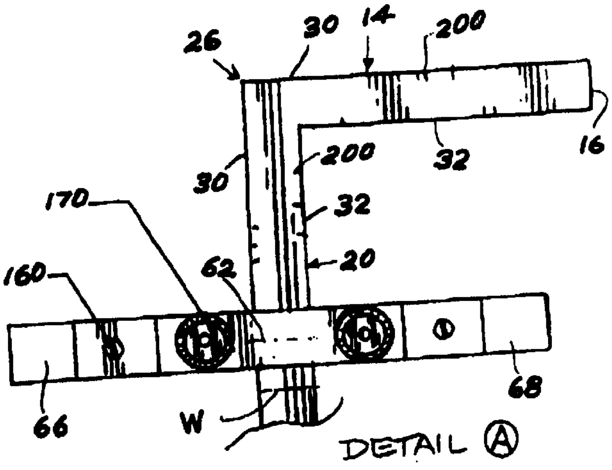
FIG. 2 is detailed view of section A indicated in FIG. 1.

Other objects, features and advantages of the invention will become apparent from a consideration of the following detailed description and the accompanying drawings.

The measuring instrument embodying the present invention permits a tradesman to square around an elbow or curve in a conduit or the like. The measuring instrument broadly has a framing square slidably held in at least one mounting bracket that will engage an obstacle, such as a conduit or pipe, at the location of a curve or elbow in the obstacle either on the inside radius or on the outside radius in a manner that positions one leg of the framing square adjacent to one portion of the conduit or pipe and the other leg of the framing square at a 90° angle with respect to the first leg and located where a second conduit is to be connected to the first conduit by an elbow or bend or the like. The bend is thus quickly and accurately made using the framing square mounted on one of the conduits that forms the elbow.

Referring to the Figures, it can be understood that the present invention is embodied in a measuring instrument 10 which comprises an L-shaped framing square 12. Framing square 12 includes a first leg 14 having a first end 16 and a second end 18. The framing square further includes a second leg 20 having a first end 22 and a second end 24. Second leg 20 is oriented at a 90° angle to the first leg 14 and the second end 18 of the first leg and the second end 24 of the second leg 20 intersect each other to define a 90° corner 26 which is spaced apart from the first end 16 of the first leg 14 and the first end 22 of the second leg 20.

The framing square 12 further includes a first side edge 30 which extends from the first end 16 of the first leg 14 to the first end 22 of the second leg 20, a second side edge 32 which extends from the first end 16 of the first leg 14 to the first end 22 of the second leg 20 and which is spaced apart from the first side edge 30. A first surface 34 is located on the first leg 14 and on the second leg 20 and a second surface 36 is on the first leg 14 and on the second leg 20 and which is spaced apart from the first surface 34. A first longitudinal axis 38 extends between the first end 16 of the first leg 14 and the second end 18 of the first leg 14 and a second longitudinal axis 40 extends between the first end 22 of the second leg 20 and the second end 24 of the second leg 20. A transverse axis 42 extends between the first side edge 30 and the second side edge 32 and a width dimension W extends in the direction of the transverse axis 42 between the first side edge 30 and the second side edge 32, and a thickness dimension T extends between the first surface 34 and the second surface 36. The width and thickness dimensions of the first leg 14 and the second leg 20 are identical.

A first alignment bracket 50 is movably mounted on the first leg 14 or the second leg 20 of the framing square 12. In the form shown in the Figures, there are two alignment brackets and both are shown mounted on the first leg 14 of the framing square 12. However, there can be more or fewer alignment brackets which are mounted on either or both of the legs 14, 20 of the framing square 12 without departing from the scope of this disclosure. All of the alignment brackets are identical and thus only alignment bracket 50 will be discussed, it being understood that the description of alignment bracket 50 also applies to any and all alignment brackets included in device 10.

Alignment bracket 50 is movably and releasably mounted on the framing square 12 and includes a first one-piece U-shaped plate element 52 having a planar bight section 54 that includes a first surface 56, a second surface 58 which is co-extensive and congruent with first surface 56, a first end 59, a second end 60, and a longitudinal axis 62 extending between first end 59 and second end 60. A first end plate 66 is located on first end 59 with first end plate 66 being oriented at an oblique angle, which is 45° in the form shown, to first surface 56 of the planar bight section 54, and a second end plate 68 is on second end 60 of the planar bight section 54. Second end plate 68 is oriented at an oblique angle, which is 45° in the form shown, to first surface 56 of the planar bight section 54.

A second one-piece U-shaped plate element 70 has a planar bight section 72 which includes a first surface 74 and a second surface 76 which is co-extensive and congruent with first surface 74. Second plate element 70 further includes a first end 78, a second end 80 and a longitudinal axis 82 extending between first end 78 of the planar bight section 72 of the second one-piece plate element 70 and second end 80 of the planar bight section 72 of the second one-piece plate element 70. Second plate element 70 further includes a first end plate 84 on first end 78 of the planar bight section 72 of the second one-piece plate element 70. First end plate 84 of the second one-piece plate element 70 is oriented at an oblique angle, which is 45° in the form shown, to first surface 74 of the planar bight section 72 of the second one-piece plate element 70. A second end plate 86 is on second end 80 of the planar bight section 72 of the second one-piece plate element 70. Second end plate 86 is oriented at an oblique angle, which is 45° in the form shown, to first surface 74 of the planar bight section 72 of the second one-piece plate element 70.

As can be seen in the figures, first end plate 66 on the first one-piece plate element 52 and first end plate 84 on the second one-piece plate element 70 are located and oriented with respect to each other when the first one-piece plate element 52 is assembled to the second one-piece plate element 70 to define a first 90° angle and to define a first obstacle-engaging channel 90 adjacent to the first ends 59 and 78 of the first one-piece plate element 52 and the second one-piece plate element 70. Second end plate 68 on the first one-piece plate element 52 and second end plate 86 on the second one-piece plate element 70 are located and oriented with respect to each other when the first one-piece plate element 52 is assembled to the second one-piece plate element 70 to define a second 90° angle and to define a second obstacle-engaging channel 92 adjacent to second ends 60 and 80 of the first one-piece plate element 52 and the second one-piece plate element 70.

Alignment bracket 50 further includes a first planar pad element 100 interposed between the bight section 54 of the first one-piece plate element 52 and the bight section 72 of the second one-piece plate element 70 when the first one-piece plate element 52 is assembled to the second one-piece plate element 70. Pad 100 includes a first surface 102 in contact with second surface 58 of the bight section 54 of the first one-piece plate element 52 when the first planar pad element 100 is assembled with the first one-piece plate element 52 and a second surface 104 that is spaced apart from first surface 102 of the first planar pad element 100 in the thickness direction of framing square 12. Second surface 102 includes a cut-out portion 106 defined in second surface 104 of the first planar pad element 100. Cut-out portion 106 is sized to slidably accommodate second leg 20 of framing square 12 when alignment bracket 50 is mounted on the framing square 12. Cut-out portion 106 further includes a first shoulder 110 on the first planar pad element 100 adjacent to the cut-out portion 106. First shoulder 110 slidably engages first side edge 30 of the framing square 12 when the alignment bracket 50 is mounted on the framing square 12 and a second shoulder 112 on the first planar pad element 100 adjacent to the cut-out portion 106. Second shoulder 112 slidably engages second side edge 32 of the framing square 12 when the alignment bracket 50 is mounted on the framing square 12. Second shoulder 112 of the first planar pad element 100 is spaced apart from first shoulder 110 by a distance W+slightly greater than the width dimension of the framing square 12. Cut-out portion 106 further includes a sliding face 114 located between first shoulder 110 and second shoulder 112 of the first planar pad element 100 and slidably engages first surface 34 of the framing square 12 when the alignment bracket 50 is mounted on the framing square 12. Sliding face 114 of the first planar pad element 100 is spaced apart from second surface 104 of the first planar pad element 100 in the direction of the thickness dimension of the framing square 12 when the alignment bracket 50 is mounted on the framing square 12. Sliding face 114 of the first planar pad element 100 is spaced apart from second surface 104 of the first planar pad element 100 by a depth dimension D-.

Alignment bracket 50 further includes a second planar pad element 120 interposed between the bight section 72 of the second one-piece plate element 70 and first planar pad element 100 when the first one-piece plate element 52 is assembled to the second one-piece plate element 70. Second planar pad 120 includes a first surface 122 in contact with second surface 76 of the bight section 72 of the second one-piece plate element 70 when the second planar pad element 120 is assembled with the second one-piece plate element 70. The second planar pad element 120 further includes a second surface 126 that is spaced apart from the first surface 122 of the second planar pad element 120 in the thickness direction of the framing square 12 when the alignment bracket 50 is assembled with the framing square 12. Second surface 126 includes a cut-out portion 130 defined in the second surface 126 of the second planar pad element 120. Cut-out portion 130 in the second planar pad element 120 is sized to slidably accommodate the second leg 20 of the framing square 12 when the alignment bracket 50 is mounted on the framing square 12. Cut-out portion 130 includes a first shoulder 134 on the second planar pad element 120 adjacent to cut-out portion 130 of the second planar pad element 120. First shoulder 134 slidably engages first side edge 30 of the framing square 12 when the alignment bracket 50 is mounted on the framing square 12. A second shoulder 136 is located on the second planar pad element 120 adjacent to cut-out portion 130 in the second planar pad element 120 and slidably engages second side edge 32 of the framing square 12 when the alignment bracket 50 is mounted on the framing square 12. Second shoulder 136 of the second planar pad element 120 is spaced apart from first shoulder 134 of the second planar pad element 120 by a distance W' which is slightly greater than the width dimension of the framing square 12.

Cut-out portion 130 further includes a sliding face 140 located between first shoulder 134 of the second planar pad element 120 and second shoulder 136 of the second planar pad element 120 and slidably engages second surface 36 of the framing square 12 when the alignment bracket 50 is mounted on the framing square 12. Sliding face 140 of the second planar pad element 120 is spaced apart from second surface 126 of the second planar pad element 120 in the direction of the thickness dimension of the framing square 12 when the alignment bracket 50 is mounted on the framing square 12. Sliding face 140 of the second planar pad element 120 is spaced apart from second surface 126 of the second planar pad element 120 by a second depth dimension D'.

Figure 3:
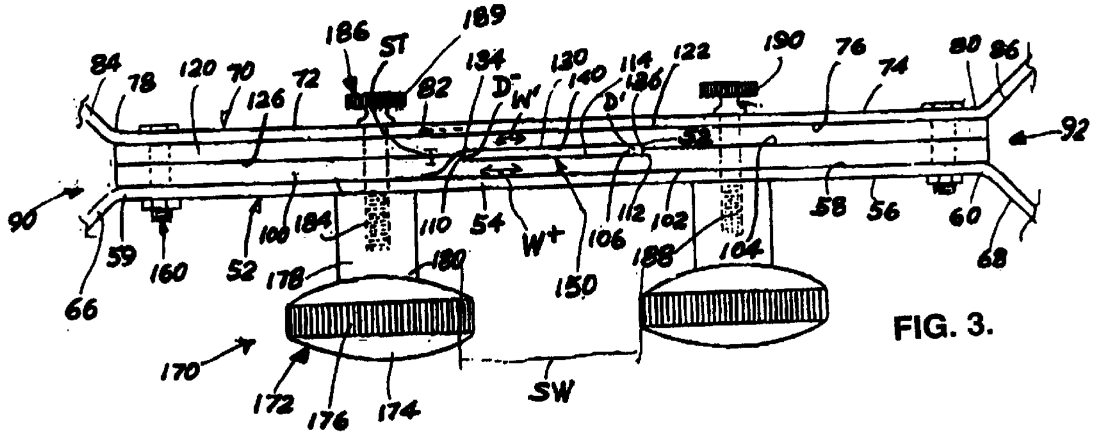
FIG. 3 is an elevational view taken along line 3—3 of FIG. 1.

As can be understood from the figures and from the foregoing, cut-out portion 106 of the first planar pad element 100 is aligned with cut-out portion 140 of the second planar pad element 120 when the first planar pad element 100 and the second planar pad element 120 are associated with each other and define a slot 150. Depth dimension D- of cut-out portion 106 in the first planar pad element 100 is added to depth dimension D' of cut-out portion 130 in the second planar pad element 120 to define a slot thickness dimension ST that is slightly greater than thickness dimension T of the framing square 12. First shoulder 110 of the cut-out portion 106 in the first planar pad element 100 is aligned with first shoulder 134 of cut-out portion 130 in the second planar pad element 120 to define a slot first wall S1 and second shoulder 112 of cut-out portion 106 in the first planar pad element 100 is aligned with second shoulder 136 of cut-out portion 130 in the second planar pad element 120 to define a slot second wall S2. Slot first wall S1 is spaced apart from slot second wall S2 in the width dimension of the second leg 20 of the framing square 12 when the alignment bracket 50 is mounted on the second leg 20 of the framing square 12. A slot width dimension SW is defined with the slot width dimension being slightly greater than the width dimension of the second leg 20 of the framing square 12. This permits the framing square 12 to be slidably accommodated in the slot. To emphasize that all of the mounting brackets are identical, the alignment bracket shown in FIG. 3 is spaced apart from the alignment bracket shown in FIG. 1, but is discussed as being identical to that alignment bracket. It is also noted that the alignment brackets can be mounted on first leg 14 of the framing bracket as well.

The alignment bracket 50 further includes a first fastener element 160 coupling the first U-shaped plate element 52 to the second U-shaped plate element 70 and coupling the first and second U-shaped plate elements 52, 70 to the first and second pad elements 100, 120 when the alignment bracket 50 is mounted on the framing square 12. There are a plurality of fastener elements 160 as can be seen in the figures.

The alignment bracket 50 further includes a first adjustable fastening unit 170 coupling the first U-shaped plate element 52 to the second U-shaped plate element 70 and coupling the first and second U-shaped plate elements 52, 70 to the first and second pad elements 100, 120 when the alignment bracket 50 is mounted on the framing square 12. As can be seen in the figures, there are a plurality of adjustable fastening units, all of which are identical to each other. First adjustable fastening unit 170 includes a knob section 172 having a handle 174, a knurled section 176 on the handle 174, a cylindrical base 178 having one end 180 fixed to the handle 174 and a second end 182 abutting first surface 56 of the first U-shaped plate element 52, and a blind-ended threaded bore 184 defined in the cylindrical base 178 and extending from the second end 182 of the cylindrical base 178 toward the handle 174. A fastening element 186 extends through the first U-shaped plate element 52 and the second U-shaped plate element 70 and couples the first and second U-shaped plate elements 52, 70 to the first and second pad elements 100, 120 and couples those elements together when the alignment bracket 50 is mounted on the framing square 12. Fastening element 186 includes a threaded portion 188 threadably engaging the threaded bore 184 defined in the cylindrical base 178 of the knob section 172 and couples the fastening element 186 to the knob section 172. The form of the fastening element 186 shown in the figures includes a head 189 having knurling 190 thereon for easing the grip of this element.

Operation of the measuring instrument 10 embodying the present invention can be understood from the foregoing and thus will only be briefly discussed as those skilled in the art will readily understand how to use the measuring instrument. As indicated in FIGS. 4 and 5, the measuring instrument 10 is placed against one portion of an obstacle that is to have an elbow, such as a 90° elbow, with the second leg 20 of the framing square 12 located adjacent to one extant portion of the obstacle. One obstacle-engaging channel of one or more of the alignment brackets is placed on the extant obstacle to support the measuring instrument 10 in place. The measuring instrument is moved so the first leg 14 of the framing square 12 is located in position where a second portion of the obstacle is either located or will be located. The elbow or other bend will then be located to smoothly couple the two portions of the obstacle and the building structure can be easily marked using the measuring instrument of the present invention which is automatically located in the desired position with respect to the conduit and the turn in the conduit. The framing square 12 is easily slipped into the slot of the alignment bracket 50 by loosening the fasteners 160 and/or 170 and then tightening those fasteners as required to produce the amount of slip desired, or to secure the alignment bracket 50 to the framing square 12.

In one form of the invention, the framing square 12 can include marking indicia 200 on either or both legs thereof.

It is understood that while certain forms of the present invention have been illustrated and described herein, it is not to be limited to the specific forms or arrangements of parts described and shown.

I claim:

1. A measuring instrument comprising:

a) an L-shaped framing square which includes
  (1) a first leg having a first end and a second end,
  (2) a second leg having a first end and a second end, the second leg being oriented at a 90° angle to the first leg, the second end of the first leg and the second end of the second leg intersecting each other to define a 90° corner which is spaced apart from the first end of the first leg and the first end of the second leg,
  (3) a first side edge which extends from the first end of the first leg to the first end of the second leg,
  (4) a second side edge which extends from the first end of the first leg to the first end of the second leg and which is spaced apart from the first side edge,
  (5) a first surface on the first leg and on the second leg,
  (6) a second surface on the first leg and on the second leg and which is spaced apart from the first surface,
  (7) a first longitudinal axis extending between the first end of the first leg and the second end of the first leg,
  (8) a second longitudinal axis extending between the first end of the second leg and the second end of the second leg,
  (9) a transverse axis extending between the first side edge and the second side edge,
  (10) a width dimension extending in the direction of the transverse axis between the first side edge and the second side edge, and
  (11) a thickness dimension extending between the first surface and the second surface; and b) a first alignment bracket movably mounted on the first or the second leg of said framing square and which includes
  (1) a first one-piece U-shaped plate element having
    (A) a planar bight section which includes
      (i) a first surface,
      (ii) a second surface which is co-extensive with the first surface of the planar bight section of the first one-piece plate element,
      (iii) a first end,
      (iv) a second end, and
      (v) a longitudinal axis extending between the first end of the planar bight section and the second end of the planar bight section,
    (B) a first end plate on the first end of the planar bight section, the first end plate being oriented at an oblique angle to the first surface of the planar bight section, and
    (C) a second end plate on the second end of the planar bight section, the second end plate being oriented at an oblique angle to the first surface of the planar bight section,
  (2) a second a one-piece U-shaped plate element having
    (A) a planar bight section which includes
      (i) a first surface,
      (ii) a second surface which is co-extensive with the first surface of the planar bight section of the second one-piece plate element,
      (iii) a first end,
      (iv) a second end, and
      (v) a longitudinal axis extending between the first end of the planar bight section of the second one-piece plate element and the second end of the planar bight section of the second one-piece plate element,
    (B) a first end plate on the first end of the planar bight section of the second one-piece plate element, the first end plate of the second one-pieced plate element being oriented at an oblique angle to the first surface of the planar bight section of the second one-piece plate element, and
    (C) a second end plate on the second end of the planar bight section of the second one-piece plate element, the second end plate of the second one-piece plate element being oriented at an oblique angle to the first surface of the planar bight section of the second one-piece plate element,
  (3) the first end plate on the first one-piece plate element and the first end plate on the second one-piece plate element being located and oriented with respect to each other when the first one-piece plate element is assembled to the second one-piece plate element to define a first 90 degree angle and to define a first obstacle-engaging channel adjacent to the first ends of the first and second one-piece plate elements,
  (4) the second end plate on the first one-piece plate element and the second end plate on the second one-piece plate element being located and oriented with respect to each other when the first one-piece plate element is assembled to the second one-piece plate element to define a second 90 degree angle and to define a second obstacle-engaging channel adjacent to the second ends of the first and second one-piece plate elements, (5) a first planar pad element interposed between the bight section of the first one-piece plate element and the bight section of the second one-piece plate element when the first one-piece plate element is assembled to the second one-piece plate element and having (A) a first surface in contact with the second surface of the bight section of the first one-piece plate element when the first planar pad element is assembled with the first one-piece plate element, (B) a second surface that is spaced apart from the first surface of the first planar pad element in the thickness direction of said framing square and which includes (i) a cut-out portion defined in the second surface of the first planar pad element, the cut-out portion being sized to slidably accommodate the second leg of said framing square when said alignment bracket is mounted on said framing square, (ii) a first shoulder on the first planar pad element adjacent to the cut-out portion and which slidably engages the first side edge of said framing square when said alignment bracket is mounted on said framing square, (iii) a second shoulder on the first planar pad element adjacent to the cut-out portion and which slidably engages the second side edge of said framing square when said alignment bracket is mounted on said framing square, the second shoulder of the first planar pad element being spaced apart from the first shoulder of the first planar pad element by a distance slightly greater than the width dimension of said framing square, (iv) a sliding face located between the first shoulder and the second shoulder of the first planar pad element and which slidably engages the first surface of said framing square when said alignment bracket is mounted on said framing square, and (v) the sliding face of the first planar pad element being spaced apart from the second surface of the first planar pad element in the direction of the thickness dimension of said framing square when said alignment bracket is mounted on said framing square, the sliding face of the first planar pad element being spaced apart from the second surface of the first planar pad element by a depth dimension, (6) a second planar pad element interposed between the bight section of the second one-piece plate element and the first planar pad element when the first one-piece plate element is assembled to the second one-piece plate element and having (A) a first surface in contact with the second surface of the bight section of the second one-piece plate element when the second planar pad element is assembled with the second one-piece plate element, (B) a second surface that is spaced apart from the first surface of the second planar pad element in the thickness direction of said framing square when said alignment bracket is assembled with said framing square and which includes (i) a cut-out portion defined in the second surface of the second planar pad element, the cut-out portion in the second planar pad element being sized to slidably accommodate the second leg of said framing square when said alignment bracket is mounted on said framing square, (ii) a first shoulder on the second planar pad element adjacent to the cut-out portion of the second planar pad element and which slidably engages the first side edge of said framing square when said alignment bracket is mounted on said framing square, (iii) a second shoulder on the second planar pad element adjacent to the cut-out portion in the second planar pad element and which slidably engages the second side edge of said framing square when said alignment bracket is mounted on said framing square, the second shoulder of the second planar pad element being spaced apart from the first shoulder of the second planar pad element by a distance slightly greater than the width dimension of said framing square, (iv) a sliding face located between the first shoulder of the second planar pad element and the second shoulder of the second planar pad element and which slidably engages the second surface of said framing square when said alignment bracket is mounted on said framing square, and (v) the sliding face of the second planar pad element being spaced apart from the second surface of the second planar pad element in the direction of the thickness dimension of said framing square when said alignment bracket is mounted on said framing square, the sliding face of the second planar pad element being spaced apart from the second surface of the second planar pad element by a second depth dimension, (7) the cut-out portion of the first planar pad element being aligned with the cut-out portion of the second planar pad element when the first and second planar pad elements are associated with each other and defining a slot, with the depth dimension of the cut-out portion in the first planar pad element being added to the depth dimension of the cut-out portion in the second planar pad element to define a slot thickness dimension that is slightly greater than the thickness dimension of said framing square and the first shoulder of the cut-out portion in the first planar pad element being aligned with the first shoulder of the cut-out portion in the second planar pad element to define a slot first wall and the second shoulder of the cut-out portion in the first planar pad element being aligned with the second shoulder of the cut-out portion in the second planar pad element to define a slot second wall, with the slot first wall being spaced apart from the slot second wall in the width dimension of the second leg of said framing square when said alignment bracket is mounted on the second leg of said framing square and defining a slot width dimension, with the slot width dimension being slightly greater than the width dimension of the second leg of said framing square, (8) a first fastener element coupling the first U-shaped plate element to the second U-shaped plate element and coupling the first and second U-shaped plate elements to the first and second pad elements when said alignment bracket is mounted on said framing square, (9) a first adjustable fastening unit coupling the first U-shaped plate element to the second U-shaped plate element and coupling the first and second U-shaped plate elements to the first and second pad elements when said alignment bracket is mounted on said framing square, with the first adjustable fastening unit including (A) a knob section having (i) a handle, (ii) a knurled section on the handle, (iii) a cylindrical base having one end fixed to the handle and a second end abutting the first surface of the first U-shaped plate element, and (iv) a threaded bore defined in the cylindrical base and extending from the second end of the cylindrical base, and (B) a fastening element extending through the first U-shaped plate element and the second U-shaped plate element and coupling the first and second U-shaped plate elements to the first and second pad elements and together when said alignment bracket is mounted on said framing square, the fastening element including a threaded portion threadably engaging the threaded bore defined in the cylindrical base of the knob section and coupling the fastening element to the knob section.

2. The measuring device as described in claim 1 further including a second alignment bracket.

3. The measuring device as described in claim 2 further including a second fastener element.

4. The measuring device as described in claim 3 further including a second adjustable fastening unit.

5. The measuring device as described in claim 1 wherein all oblique angles are 45°.

6. The measuring device as described in claim 5 wherein all obstacle-engaging channels include an angle of 90°.

* * * * *